United States Patent
Kim et al.

(10) Patent No.: US 11,448,800 B2
(45) Date of Patent: Sep. 20, 2022

(54) DECORATIVE MEMBER AND METHOD FOR PREPARING SAME

(71) Applicant: LG CHEM, LTD., Seoul (KR)

(72) Inventors: Yong Chan Kim, Daejeon (KR); Jeong Woo Shon, Daejeon (KR); Pilsung Jo, Daejeon (KR); Ki Hwan Kim, Daejeon (KR); Song Ho Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 50 days.

(21) Appl. No.: 16/614,743

(22) PCT Filed: Jun. 27, 2018

(86) PCT No.: PCT/KR2018/007280
§ 371 (c)(1),
(2) Date: Nov. 18, 2019

(87) PCT Pub. No.: WO2019/004723
PCT Pub. Date: Jan. 3, 2019

(65) Prior Publication Data
US 2020/0088917 A1    Mar. 19, 2020

(30) Foreign Application Priority Data

Jun. 27, 2017 (KR) .................. 10-2017-0081405
Oct. 20, 2017 (KR) .................. 10-2017-0136810

(51) Int. Cl.
*B32B 3/06* (2006.01)
*G02B 5/00* (2006.01)
*G02B 5/08* (2006.01)

(52) U.S. Cl.
CPC ............. *G02B 5/003* (2013.01); *G02B 5/085* (2013.01); *Y10T 428/24917* (2015.01)

(58) Field of Classification Search
None
See application file for complete search history.

(56) References Cited

U.S. PATENT DOCUMENTS

| | | | |
|---|---|---|---|
| 9,187,820 B2 | 11/2015 | Kawaguchi et al. | |
| 9,903,989 B2 | 2/2018 | Kim et al. | |
| 2003/0031891 A1* | 2/2003 | Fields .................. | B32B 3/16 428/626 |
| 2003/0160741 A1 | 8/2003 | Martinez | |
| 2005/0181531 A1* | 8/2005 | Kamiya .............. | H01Q 1/3233 438/66 |
| 2008/0150148 A1* | 6/2008 | Frey .................. | H05K 3/184 257/769 |

(Continued)

FOREIGN PATENT DOCUMENTS

| CN | 2056903 U | 5/1990 |
|---|---|---|
| CN | 101396884 A | 4/2009 |

(Continued)

OTHER PUBLICATIONS

Mokrzycki W.S., et al., "Colour Difference ΔE—A Survey", Machine Graphics and Vision, Apr. 2011, 20(4) 383-411.

*Primary Examiner* — Seth Dumbris
(74) *Attorney, Agent, or Firm* — Dentons US LLP

(57) ABSTRACT

The present disclosure relates to a decoration element comprising a light reflective layer; and a light absorbing layer provided on the light reflective layer, wherein the light reflective layer is a discontinuous film.

14 Claims, 13 Drawing Sheets

(56) References Cited

U.S. PATENT DOCUMENTS

| | | | |
|---|---|---|---|
| 2009/0080076 A1 | 3/2009 | Fujikura et al. | |
| 2010/0143724 A1* | 6/2010 | Johnson | B32B 27/365 428/424.4 |
| 2011/0262713 A1 | 10/2011 | Nakao et al. | |
| 2011/0273356 A1 | 11/2011 | Kawaguchi et al. | |
| 2012/0003489 A1 | 1/2012 | Ying | |
| 2012/0050299 A1 | 3/2012 | Mignard et al. | |
| 2012/0064353 A1 | 3/2012 | Kawaguchi et al. | |
| 2013/0330525 A1* | 12/2013 | Yoshinaga | B32B 15/08 428/201 |
| 2015/0212244 A1* | 7/2015 | Kim | C23C 14/34 204/192.28 |
| 2017/0231105 A1 | 8/2017 | Abe et al. | |
| 2018/0009143 A1 | 1/2018 | Abe et al. | |

FOREIGN PATENT DOCUMENTS

| | | |
|---|---|---|
| CN | 102282288 A | 12/2011 |
| CN | 102310706 A | 1/2012 |
| CN | 103367913 A | 10/2013 |
| EP | 1560289 A2 | 8/2005 |
| JP | 718458 | 3/1995 |
| JP | 2000-290044 A | 10/2000 |
| JP | 2006-276008 A | 10/2006 |
| JP | 2007-241923 A | 9/2007 |
| JP | 2008-106112 A | 5/2008 |
| JP | 2008-229997 A | 10/2008 |
| JP | 2008-238647 A | 10/2008 |
| JP | 2009-501095 A | 1/2009 |
| JP | 2009-90638 A | 4/2009 |
| JP | 2009-90639 A | 4/2009 |
| JP | 2009-527646 A | 7/2009 |
| JP | 2010-197798 A | 9/2010 |
| JP | 2010-214790 A | 9/2010 |
| JP | 2010-251899 A | 11/2010 |
| JP | 2010251899 A * | 11/2010 |
| JP | 2011-140136 A | 7/2011 |
| JP | 5016722 B2 | 6/2012 |
| JP | 2013-86469 A | 5/2013 |
| JP | 2013-541037 A | 11/2013 |
| JP | 2015-533678 A | 11/2015 |
| JP | 2017-156697 A | 9/2017 |
| KR | 1020020060633 A | 7/2002 |
| KR | 1020090126531 A | 12/2009 |
| KR | 10-1512236 B1 | 4/2015 |
| WO | 2013/122181 A1 | 8/2013 |
| WO | 2016/027391 A1 | 2/2016 |
| WO | 2016/125212 A1 | 8/2016 |
| WO | 2018/221099 A1 | 12/2018 |

* cited by examiner

【DRAWINGS】
【FIG. 1】
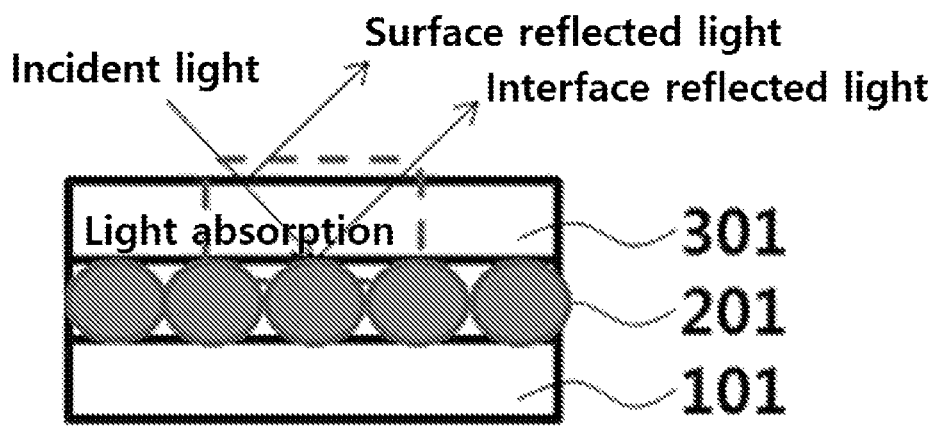
【FIG. 2】
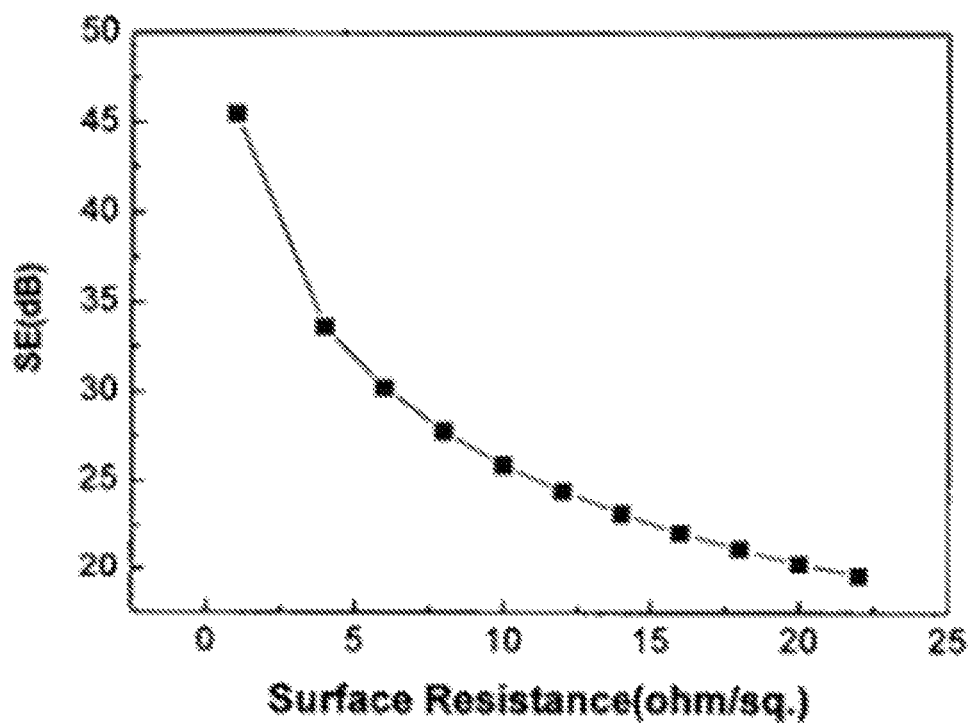

[FIG. 3]
(a) Observing Direction
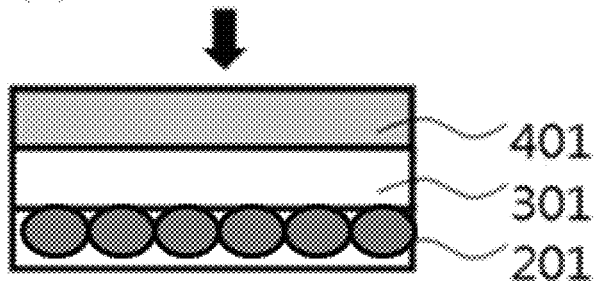
(b) Observing Direction
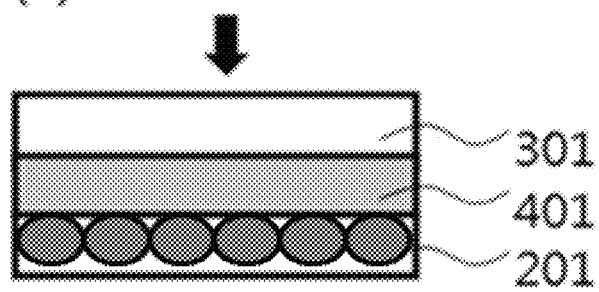
(c) Observing Direction
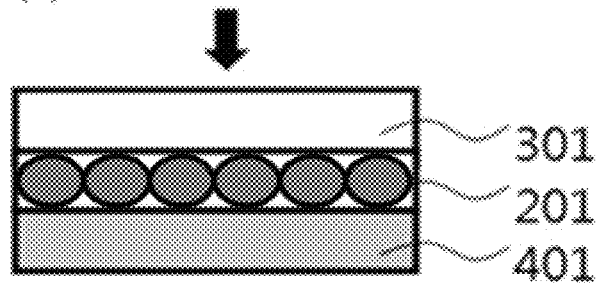

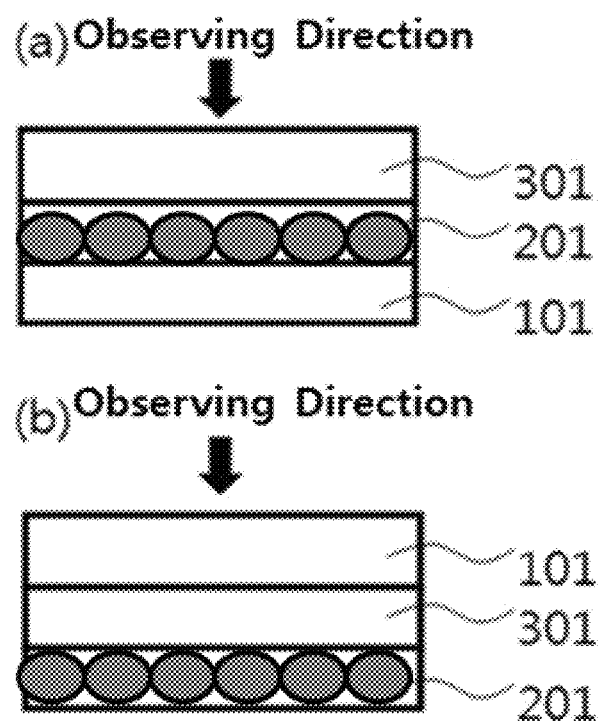
[FIG. 4]

[FIG. 5]
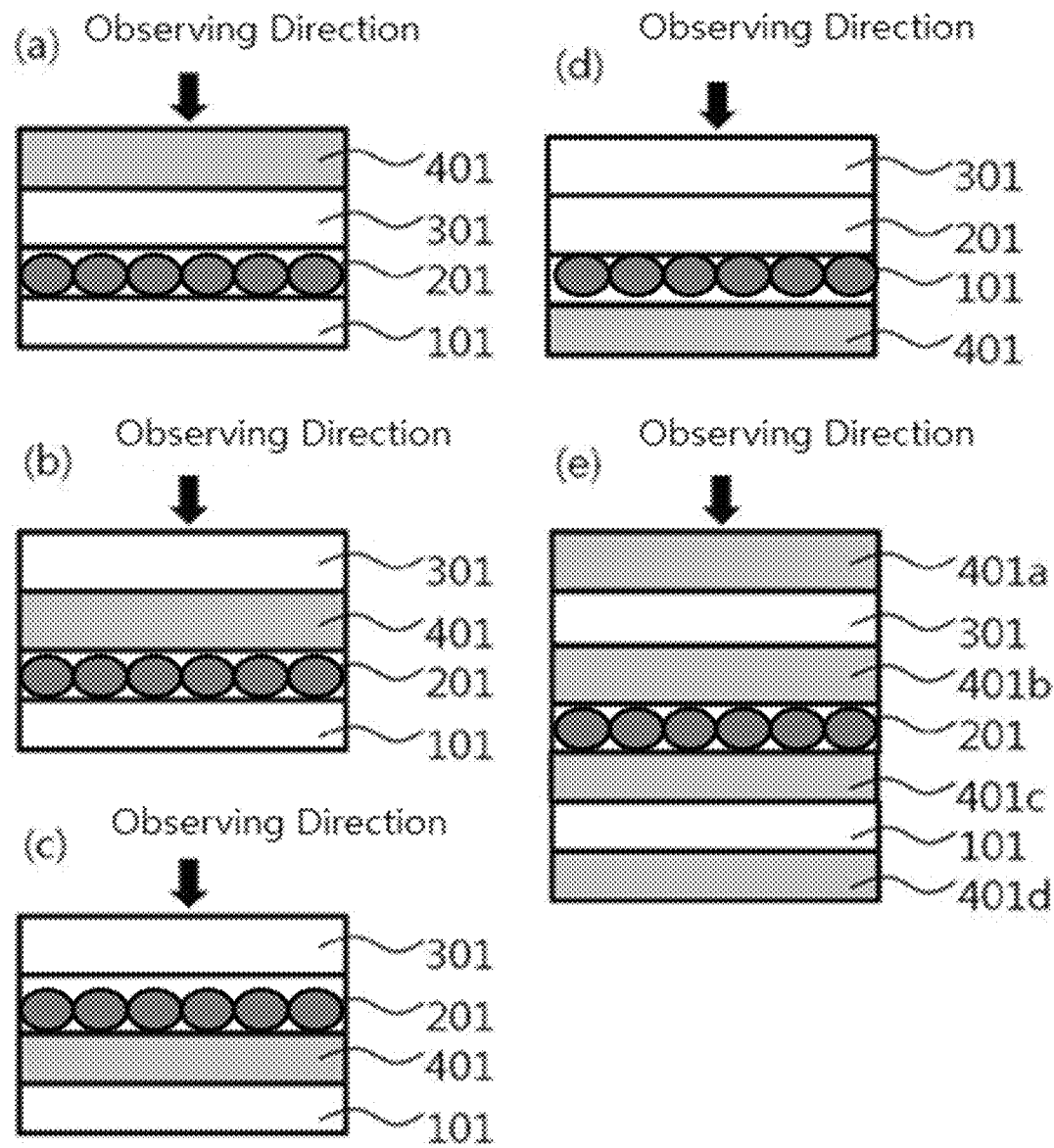

[FIG. 6]
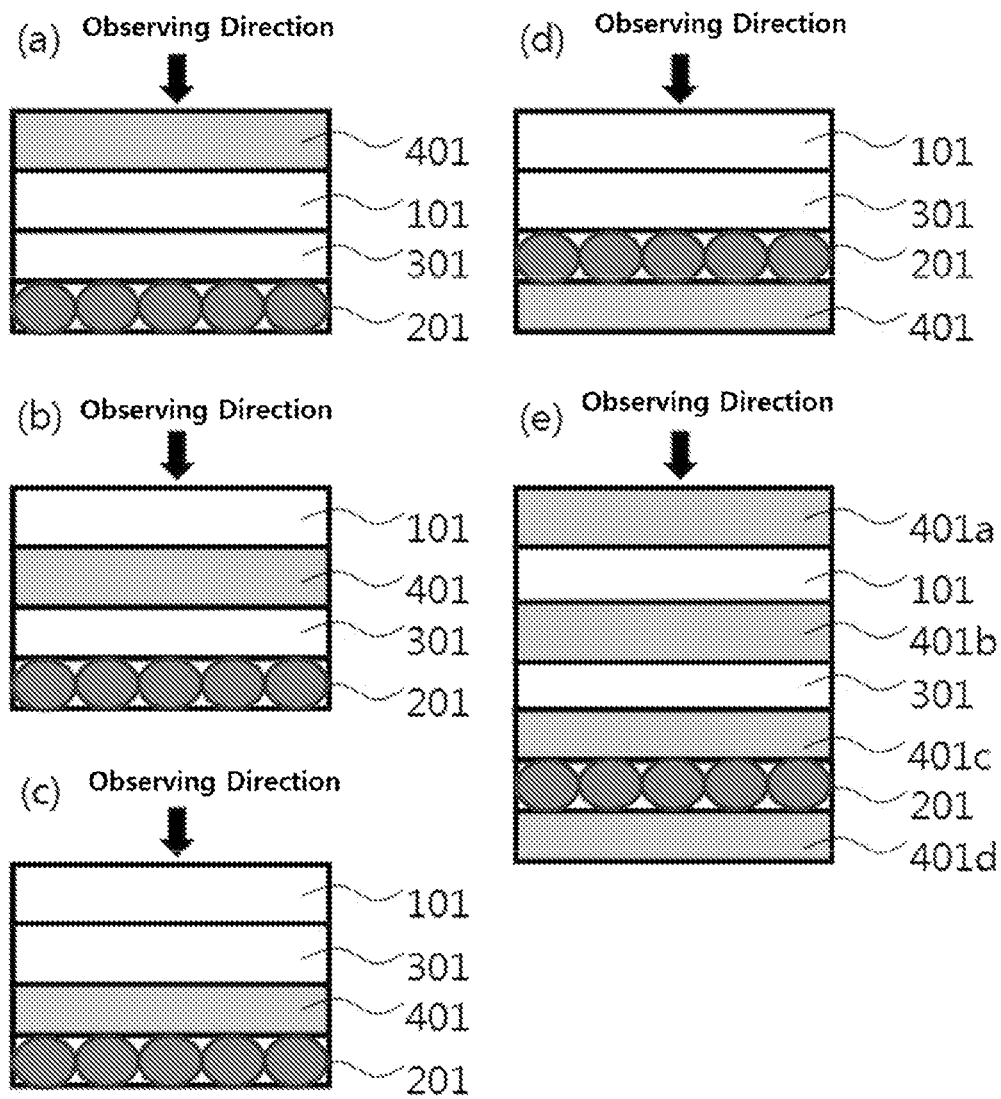

[FIG. 7]
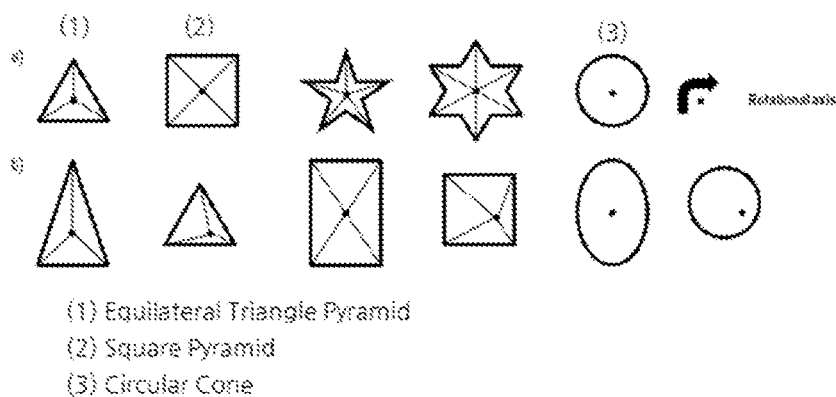
(1) Equilateral Triangle Pyramid
(2) Square Pyramid
(3) Circular Cone
[FIG. 8]
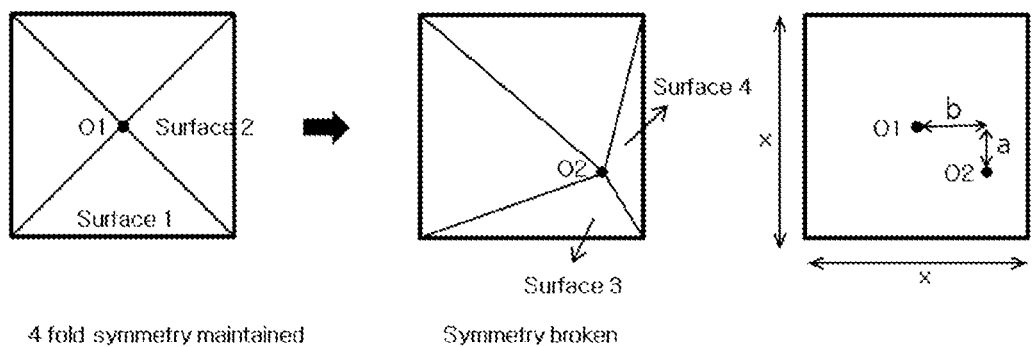
4 fold symmetry maintained    Symmetry broken

[FIG. 9]
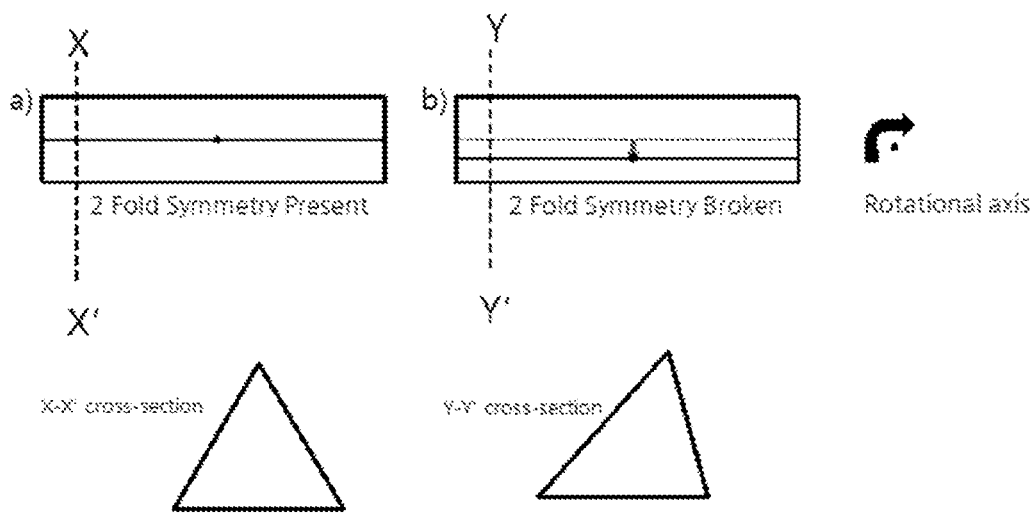

[FIG. 10]
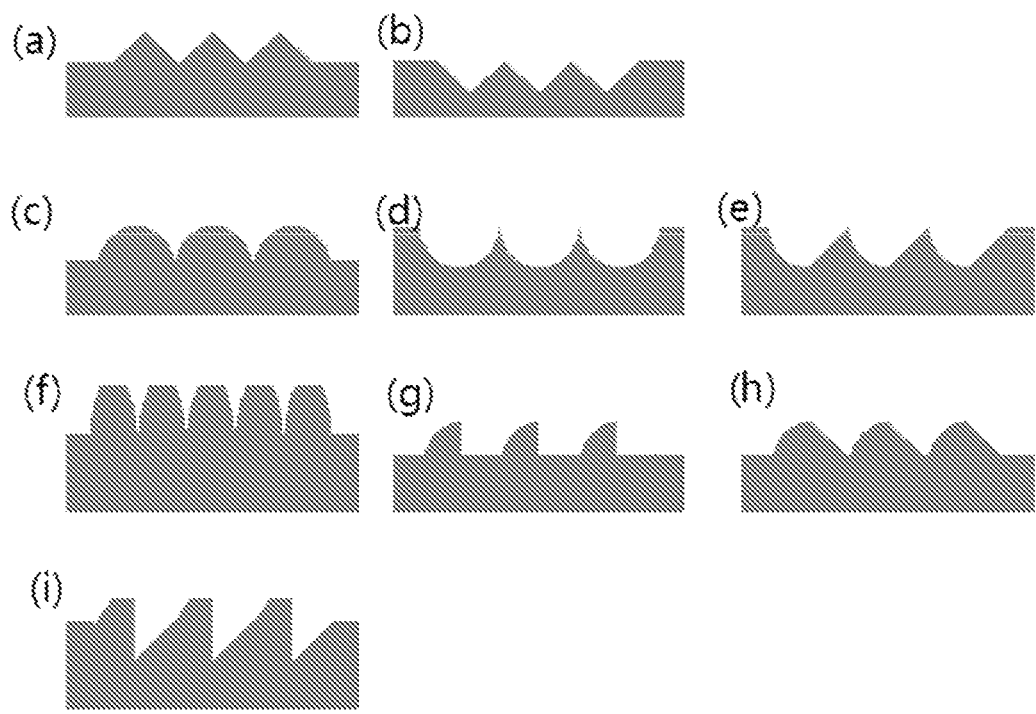

[FIG. 11]
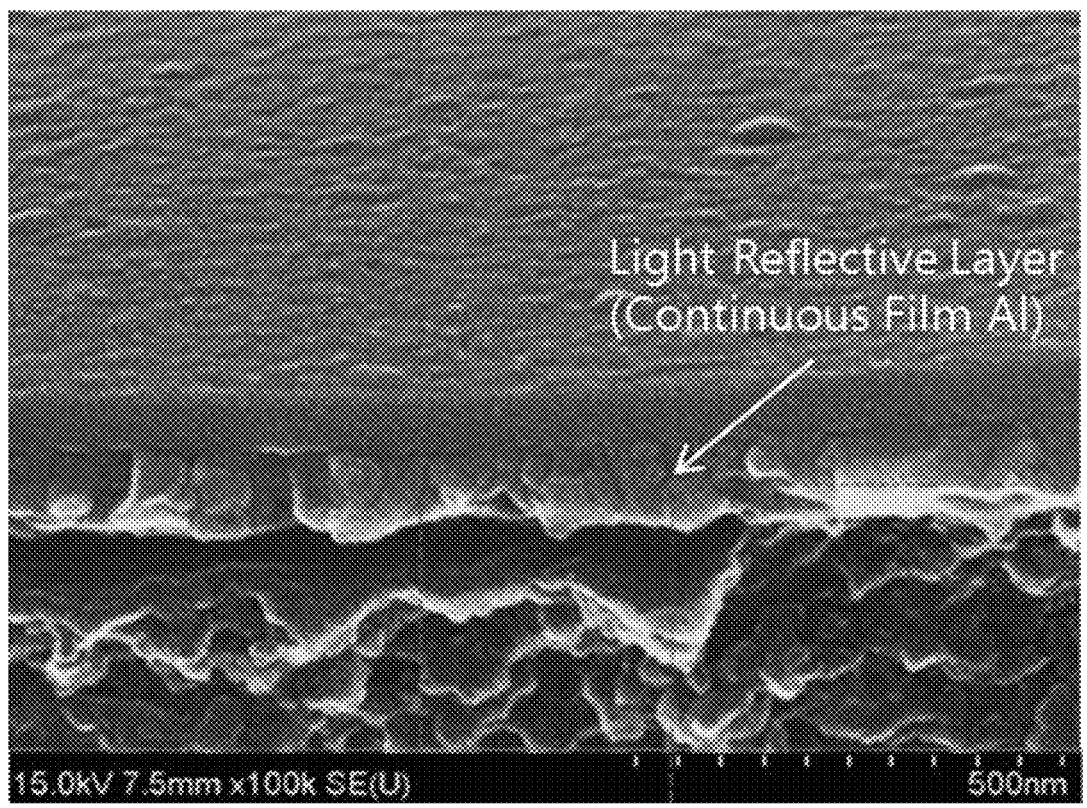

[FIG. 12]
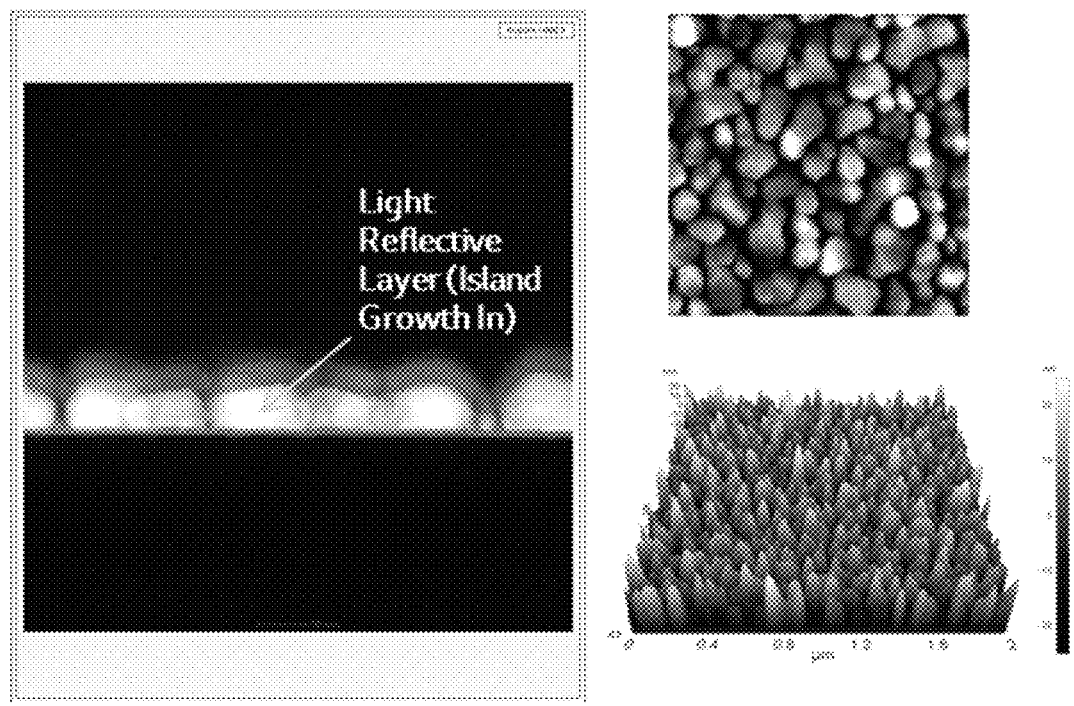

[FIG. 13]
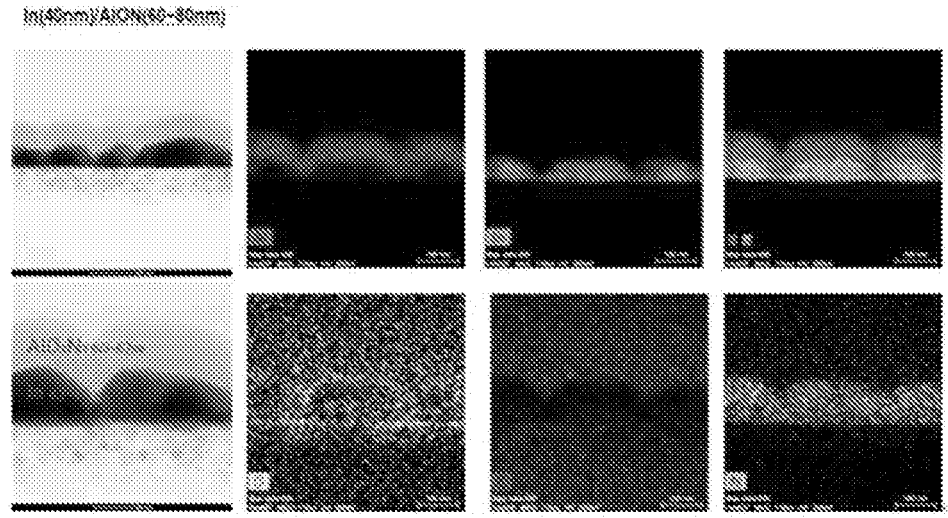
[FIG. 14]
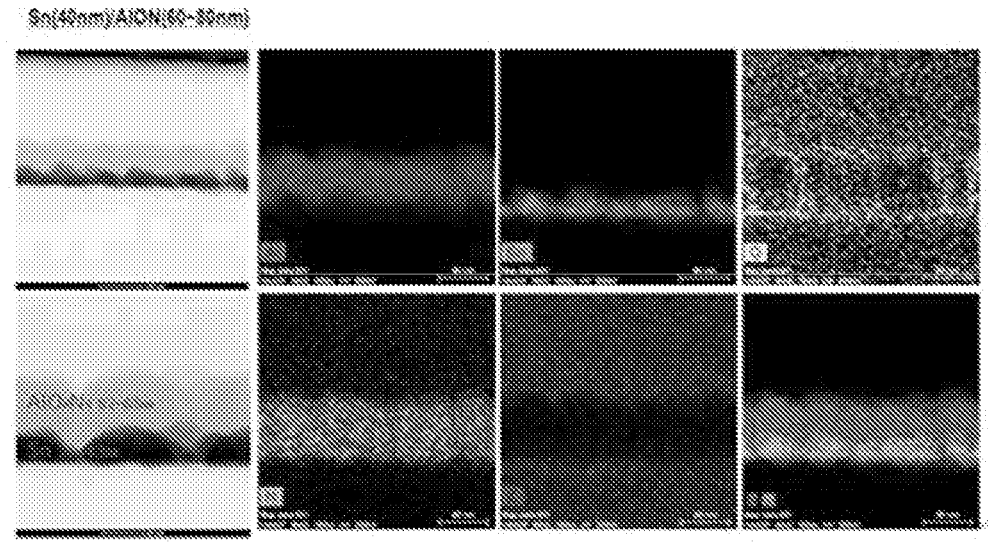

[FIG. 15]
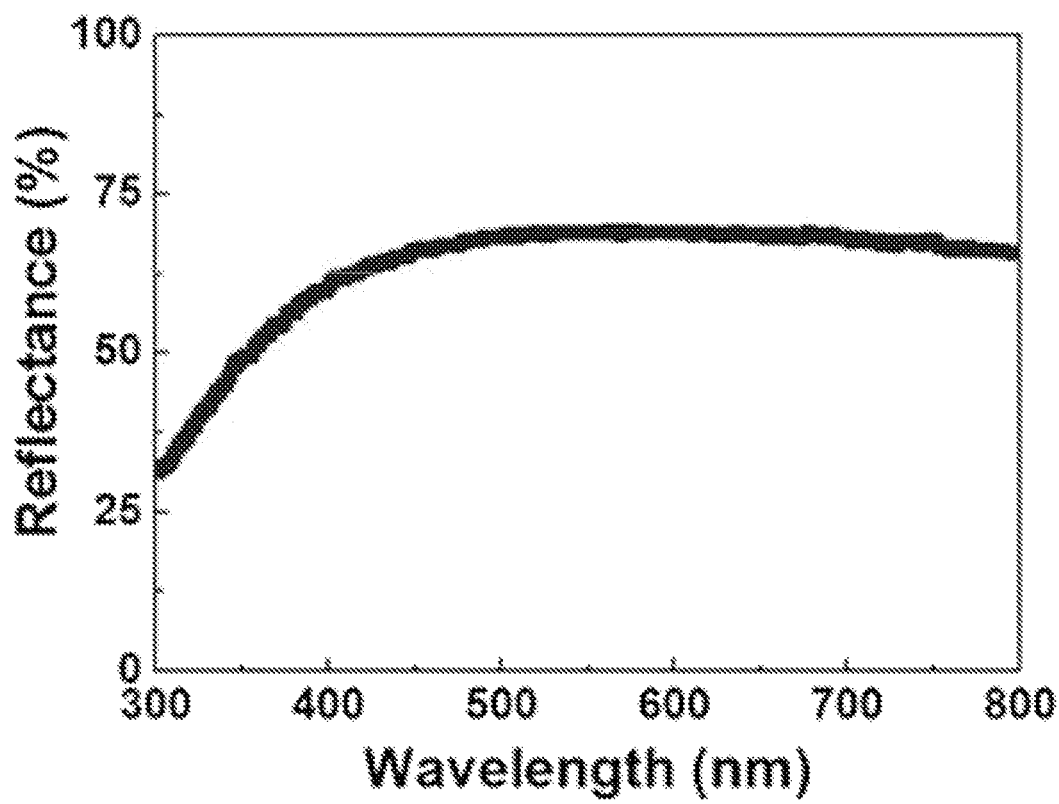
[FIG. 16]
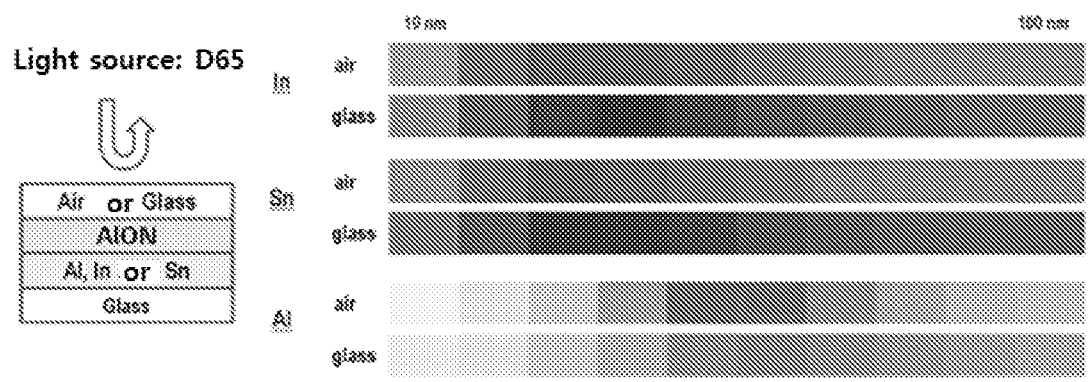

[FIG. 17]
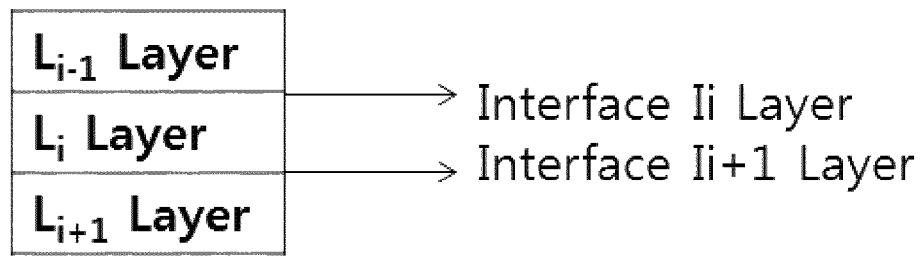

DECORATIVE MEMBER AND METHOD FOR PREPARING SAME

The present application is a National Phase entry pursuant to 35 U.S.C. § 371 of PCT/KR2018/007280 filed Jun. 27, 2018, and claims priority to and the benefit of Korean Patent Application No. 10-2017-0081405, filed with the Korean Intellectual Property Office on Jun. 27, 2017, and Korean Patent Application No. 10-2017-0136810, filed with the Korean Intellectual Property Office on Oct. 20, 2017, the entire contents of which are incorporated herein by reference in their entirety.

FIELD

The present disclosure relates to, for example, a decoration element and a method for preparing the same. In particular, the present disclosure relates to a decoration element suitable to be used in mobile devices or electronic products, and a method for preparing the same.

BACKGROUND

For mobile phones, various mobile devices and electronic products, product designs such as colors, shapes and patterns play a major role in providing value of products to customers in addition to product functions. Product preferences and prices are also dependent on designs.

As for mobile phones as one example, various colors and color senses are obtained using various methods and used in products. A method of providing colors to a mobile phone case material itself or a method of providing designs by attaching a deco film imparting colors and shapes to a case material may be included.

In existing deco films, attempts have been made to develop colors through methods such as printing and deposition. When expressing heterogeneous colors on a single surface, printing needs to be conducted two or more times, and implementation is hardly realistic when applying various colors to a three-dimensional pattern. In addition, existing deco films have fixed colors depending on viewing angle, and even when there is a slight change, the change is limited to just a difference in the color sense.

SUMMARY

The present disclosure is directed to providing a decoration element capable minimizing radio frequency (RF) reception interference factor caused by electro-magnetic (EMI) shielding properties as well as readily obtaining various colors due to a laminated structure of a light reflective layer and a light absorbing layer.

One embodiment of the present application provides a decoration element comprising a light reflective layer; and a light absorbing layer provided on the light reflective layer, wherein the light reflective layer is a discontinuous film.

According to another embodiment of the present application, the light reflective layer has surface resistance of 20 ohm/square or greater, and preferably, 1 giga-ohm/square or greater.

According to another embodiment of the present application, a color film is further provided between the light reflective layer and the light absorbing layer; on a surface of the light reflective layer opposite to the surface facing the light absorbing layer; or on a surface of the light absorbing layer opposite to the surface facing the light reflective layer. The color film employs a color difference $\Delta E^*ab$, a distance in space of $L^*a^*b^*$ in a color coordinate CIE $L^*a^*b^*$ of a color developing layer, greater than 1 when the color film is present compared to when the color film is not provided.

In the present specification, the light absorbing layer may be expressed as the color developing layer.

According to another embodiment of the present application, a transparent substrate is provided on a surface of the light reflective layer opposite to the surface facing the light absorbing layer; or on a surface of the light absorbing layer opposite to the surface facing the light reflective layer. For example, when the transparent substrate is provided on a surface of the light reflective layer opposite to the surface facing the light absorbing layer and the color film is located on a surface of the light reflective layer opposite to the surface facing the light absorbing layer, the color film may be provided between the transparent substrate and the light reflective layer; or on a surface of the transparent substrate opposite to the surface facing the light reflective layer. As another example, when the transparent substrate is provided on a surface of the light absorbing layer opposite to the surface facing the light reflective layer and the color film is located on a surface of the light absorbing layer opposite to the surface facing the light reflective layer, the color film may be provided between the transparent substrate and the light absorbing layer; or on a surface of the transparent substrate opposite to the surface facing the light absorbing layer.

According to another embodiment of the present application, the transparent substrate is provided on a surface of the light reflective layer opposite to the surface facing the light absorbing layer, and the color film is provided between the transparent substrate and the light reflective layer; or on a surface of the transparent substrate opposite to the surface facing the light reflective layer, or the transparent substrate is provided on a surface of the light absorbing layer opposite to the surface facing the light reflective layer, and the color film is provided between the transparent substrate and the light absorbing layer; or on a surface of the transparent substrate opposite to the surface facing the light absorbing layer.

According to another embodiment of the present application, the light absorbing layer comprises two or more points with different thicknesses.

According to another embodiment of the present application, the light absorbing layer comprises two or more regions with different thicknesses.

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

According to another embodiment of the present application, the light absorbing layer comprises one or more regions with a gradually changing thickness.

According to another embodiment of the present application, the light absorbing layer comprises one or more regions in which an upper surface has an inclined surface with an inclined angle of greater than 0 degrees and less than or equal to 90 degrees, and at least one region having the inclined surface has a structure in which a thickness of the light absorbing layer gradually changes.

According to another embodiment of the present application, the light absorbing layer has an extinction coefficient (k) value of greater than 0 and less than or equal to 4 at 400 nm.

According to another embodiment of the present application, the decoration element is a deco film, a case of a mobile device, a case of an electronic product, or a commodity requiring color decoration.

According to embodiments described in the present specification, light absorption occurs in each entering path when external light enters through a color developing layer and in a reflection path when reflected. Since external light is reflected on each of a light absorbing layer surface and a light reflective layer surface, constructive interference and destructive interference phenomena occur between reflected light on the light absorbing layer surface and reflected light on the light reflective layer surface. Specific colors may be developed through such light absorption in the entering path and the reflection path, and the constructive interference and destructive interference phenomena. In addition, since developed colors are thickness dependent, colors may vary depending on thicknesses even when having the same material composition. In addition thereto, by using a light reflective layer having surface resistance within a specific range, while having light reflection properties as the light reflective layer in the laminated light reflective and light absorbing layers, interference with radio frequency (RF) reception caused by electro-magnetic (EMI) shielding properties is minimized, and inhibiting functioning of electronic devices by the decoration element can be prevented.

BRIEF DESCRIPTION OF THE DRAWINGS

FIG. 1 is a mimetic diagram for describing a working principle of color development in a light reflective layer and light absorbing layer structure.

FIG. 2 shows surface resistance-dependent electro-magnetic wave shielding properties.

FIG. 3 to FIG. 6 illustrate a laminated structures of a decoration elements according to alternative embodiments of the present disclosure.

FIG. 7 to FIG. 10 illustrate upper surface structures of a light absorbing layer of a decoration element according to alternative embodiments of the present application.

FIGS. 11 and 12 are photographs showing continuity of films prepared in Comparative Example 1 and Example 1, respectively.

FIGS. 13 and 14 are photographs showing continuity of films prepared in Examples 4 and 7, respectively.

FIG. 15 is a graph showing light reflectance of an indium layer.

FIG. 16 shows results of simulating colors of a decoration element having an aluminum layer, an indium layer or a tin layer as a light reflective layer.

FIG. 17 is a diagram showing a method of discriminating a light absorbing layer and a light reflective layer.

DETAILED DESCRIPTION

Hereinafter, the present disclosure will be described in detail.

In the present specification, a "point" means one position that does not have an area. In the present specification, the expression is used to indicate that a light absorbing layer has two or more points with different thicknesses.

In the present specification, a "region" represents a part having a certain area. For example, when placing the decoration element on the ground so that a light reflective layer is placed at the bottom and the light absorbing layer is placed at the top and dividing both ends of the inclined surface or both ends with the same thickness perpendicular with respect to the ground, the region having an inclined surface means an area divided by the both ends of the inclined surface, and the region with the same thickness means an area divided by the both ends with the same thickness.

In the present specification, a "surface" or "region" may be a flat surface, but is not limited thereto, and a part or all may be a curved surface. For example, structures in which a vertical cross-section shape is a part of an arc of a circle or oval, a wave structure, a zigzag or the like may be included.

In the present specification, an "inclined surface" means, when placing the decoration member on the ground so that a light reflective layer is placed at the bottom and the light absorbing layer is placed at the top, a surface having an angle formed by the upper surface with respect to the ground of greater than 0 degrees and less than or equal to 90 degrees.

In the present specification, a "thickness" of a certain layer means a shortest distance from a lower surface to an upper surface of the corresponding layer.

In the present specification, "or" represents, unless defined otherwise, a case of selectively or all comprising those listed, that is, a meaning of "and/or".

In the present specification, surface resistance may be measured in accordance with a 4-point probe method using a known sheet resistor. As for the surface resistance, a resistance value (V/I) is measured by measuring a current (I) and voltage (V) using 4 probes, and by using an area (unit area, W) of a sample and a distance (L) between electrodes for measuring resistance, surface resistance is obtained (V/I×W/L), and then, a resistive corrector factor (RCF) is multiplied thereby to calculate as ohm/square, a surface resistance unit. The resistive corrector factor may be calculated using a sample size, a sample thickness and a temperature at the time of measurement, and may be calculated using the Poisson's equation. Surface resistance of the whole laminate may be measured and calculated from the laminate itself, and surface resistance of each layer may be measured before forming layers formed with remaining materials other than a target layer to measure from the whole laminate, may be measured after removing layers formed with remaining materials other than a target layer to measure from the whole laminate, or may be measured by analyzing materials of a target layer and then forming a layer under the same condition as the target layer.

A decoration element according to one embodiment of the present application comprises a light reflective layer; and a light absorbing layer provided on the light reflective layer, wherein the light reflective layer is a discontinuous film. A discontinuous film, as opposed to a continuous film, means a film having two or more physically separated parts. Examples of the discontinuous film comprise an island structure, a mesh structure and the like.

FIG. 1 illustrates a laminated structure of a decoration element according to one embodiment of the present disclosure. According to FIG. 1, light absorption occurs in an entering path and a reflection path of light in the light absorbing layer, and by the light reflecting on each of a surface of the light absorbing layer and an interface of the light absorbing layer and the light reflective layer, the two reflections go through constructive or destructive interference. In the present specification, the light reflected on the surface of the light absorbing layer may be expressed as surface reflected light, and the light reflected on the interface of the light absorbing layer and the light reflective layer may be expressed as interface reflected light. In FIG. 1, a substrate (101) is provided at the bottom of the light reflective layer (201), however, it is not required. In addition, the light reflective layer (201) is formed as a discontinuous film in FIG. 1. A high-resistance light reflective layer may be provided thereby. FIG. 1 illustrates a structure in which the light absorbing layer (301) is formed as a continuous film, however, the structure is not limited thereto, and the light absorbing layer (301) may also have a discontinuous film structure.

In FIG. 17, the light absorbing layer and the light reflective layer are illustrated. In the decoration element of FIG. 17, each layer is laminated in order of a $L_{i-1}$ layer, a $L_i$ layer and a $L_{i+1}$ layer based on a light entering direction, an interface $I_i$ is located between the layer and the $L_i$ layer, and an interface $I_{i+1}$ is located between the $L_i$ layer and the $L_{i+1}$ layer.

When irradiating light having a specific wavelength in a direction perpendicular to each layer so that thin film interference does not occur, reflectance at the interface $I_i$ may be expressed by the following Mathematical Equation 1.

$$\frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2}$$ [Mathematical Equation 1]

In Mathematical Equation 1, $n_i(\lambda)$ means a refractive index depending on the wavelength ($\lambda$) of the $i^{th}$ layer, and $k_i(\lambda)$ means an extinction coefficient depending on the wavelength ($\lambda$) of the $i^{th}$ layer. The extinction coefficient is a measure capable of defining how strongly a subject material absorbs light at a specific wavelength, and the definition is as described above.

Using Mathematical Equation 1, when a sum of reflectance for each wavelength at the interface $I_i$ calculated at each wavelength is $R_i$, $R_i$ is calculated according to the following Mathematical Equation 2.

$$R_i = \frac{\sum_{\lambda=380nm}^{\lambda=780nm} \frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \Delta\lambda}{\sum_{\lambda=380nm}^{\lambda=780nm} \Delta\lambda}$$ [Mathematical Equation 2]

For example, when the light reflective layer has a structure of two or more islands, the electrically insulated area becomes smaller compared to the area of the whole light reflective layer, and therefore, resistance increases.

As a specific example, the light reflective layer has a structure of two or more, and the area of the horizontal cross-sectional area of each of the islands is $10^{-14}$ $m^2$ or less corresponding to 100 nm*100 nm, and preferably $2.5*10^{-15}$ $m^2$ or less corresponding to 50 nm*50 nm.

The light reflective layer has surface resistance of preferably 20 ohm/square or greater, 100 ohm/square or greater, preferably 500 ohm/square or greater, preferably 5,000 ohm/square or greater, more preferably 10,000 ohm/square or greater, and most preferably 1 giga-ohm/square or greater. According to FIG. 2, it is seen that, an electro-magnetic wave shielding effect is maximized when the surface resistance is 20 ohm/square or greater.

According to one embodiment, the light reflective layer may have a maximum surface resistance of 10 giga-ohm/square.

According to another embodiment of the present application, the light reflective layer material may have specific resistance of $2\times10^{-4}$ ohm*cm or greater, preferably $1\times10^{-3}$ ohm*cm or greater, more preferably 10 ohm*cm or greater, and most preferably $10^4$ ohm*cm or greater. However, the specific resistance is not limited thereto, and, depending on the structure of the discontinuous film described above, materials having a lower specific resistance value may also be used as long as it has a structure capable of further increasing surface resistance of the light reflective layer.

Metal materials may be generally used for light reflection properties of the light reflective layer, however, metal materials such as aluminum have high electrical conductivity. This may interfere with RF reception due to electro-magnetic wave shielding properties when used in electronic devices, such as mobile devices like mobile phones. However, according to the above-mentioned embodiment, interference with RF reception may be minimized since the light reflective layer has high surface resistance.

The light reflective layer is not particularly limited as long as it is a material capable of reflecting light, and, as a material that may be formed to have a discontinuous film structure as above, capable of having the surface resistance described above by the discontinuous film structure. Light reflectance may be determined depending on the material, and for example, colors are readily expressed at 50% or greater. Light reflectance may be measured using an ellipsometer.

As one example, the light reflective layer may be a single layer or a multilayer comprising one, two or more types of materials selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag), or oxides, nitrides or oxynitrides thereof, and one, two or more types of materials among carbon and carbon composites. For example, the light reflective layer may comprise two or more alloys selected from among the above-mentioned materials, or oxides, nitrides or oxynitrides thereof. According to another embodiment, the light reflective layer may allow highly resistant reflective layer by being prepared using an ink comprising carbon or carbon composites. Carbon black, CNT and the like may be included as the carbon or carbon composites. The ink comprising carbon or carbon composites may comprise above-described materials, or oxides, nitrides or oxynitrides thereof, and for example, one, two or more types of oxides selected from among indium (In), titanium (Ti), tin (Sn), silicon (Si), germanium (Ge). aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag) may be included. A curing process may be further carried out after printing the ink comprising carbon or carbon composites.

When the light reflective layer comprises two or more types of materials, the two or more types of materials may be formed using one process, for example, a method of deposition or printing, however, a method of first forming a layer using one or more types of materials, and then additionally forming a layer thereon using one or more types of materials may be used. For example, a light reflective layer may be formed by island growing indium or tin, then printing an ink comprising carbon, and then curing the result. The ink may further comprise oxides such as titanium oxides or silicon oxides.

According to one embodiment, the light reflective layer may comprise one type among indium (In), titanium (Ti), tin (Sn), silicon (Si) and germanium (Ge), or two or more types of alloys thereof, or oxides thereof, nitrides thereof or oxynitrides thereof, and one, two or more types among carbon and carbon composites.

According to one embodiment, the light reflective layer may be formed with one or more of indium (In), titanium (Ti), tin (Sn), silicon (Si) and germanium (Ge), or two or more types of alloys thereof, or oxides thereof, nitrides thereof or oxynitrides thereof. These materials are a non-conductive vacuum metallization (NCVM) material, and have properties such that a thin film growth mode produces an island structure rather than a continuous film, at a thickness of less than 50 nm. Metals other than the materials have a critical thickness of less than 30 nm, and are known to grow to a continuous film form after going through an island-type growth mode at the beginning.

Like the light reflective layer, the light absorbing layer may have a discontinuous film structure, or may have a continuous film structure on the light reflective layer.

The light absorbing layer has surface resistance of preferably 20 ohm/square or greater, 100 ohm/square or greater, preferably 500 ohm/square or greater, preferably 5,000 ohm/square or greater, more preferably 10,000 ohm/square or greater, and most preferably 1 giga-ohm/square or greater.

According to another embodiment of the present application, surface resistance of the whole decoration element comprising the light reflective layer and the light absorbing layer is 20 ohm/square or greater, 100 ohm/square or greater, preferably 500 ohm/square or greater, preferably 5,000 ohm/square or greater, more preferably 10,000 ohm/square or greater, most preferably 1 giga-ohm/square or greater, and more preferably 4 giga-ohm/square or greater.

The light absorbing layer preferably has a refractive index (n) of 0 to 8 at 400 nm, and the refractive index may be from 0 to 7, may be from 0.01 to 3, and may be from 2 to 2.5. The refractive index (n) may be calculated by $\sin\theta_1/\sin\theta_2$ ($\theta_1$ is an angle of light incident on a surface of the light absorbing layer, and $\theta_2$ is a refraction angle of light inside the light absorbing layer).

The light absorbing layer preferably has a refractive index (n) of 0 to 8 at 380 nm to 780 nm, and the refractive index may be from 0 to 7, may be from 0.01 to 3, and may be from 2 to 2.5.

The light absorbing layer may have an extinction coefficient (k) of greater than 0 and less than or equal to 4 at 400 nm, and the extinction coefficient (k) is preferably from 0.01 to 4, may be from 0.01 to 3.5, may be from 0.01 to 3, and may be from 0.1 to 1. The extinction coefficient (k) is $-\lambda/4\pi I$ (dI/dx) (herein, a value multiplying $\lambda/4\pi$ with dI/I, a reduced fraction of light intensity per a path unit length (dx), for example 1 m, in the light absorbing layer, and herein, $\lambda$ is a wavelength of light).

The light absorbing layer may preferably have an extinction coefficient (k) of greater than 0 and less than or equal to 4 at 380 nm to 780 nm, and for example, the extinction coefficient (k) is preferably from 0.01 to 4, may be from 0.01 to 3.5, may be from 0.01 to 3, and may be from 0.1 to 1.

The extinction coefficient (k) is in the above-mentioned range at 400 nm, preferably in the whole visible wavelength region of 380 to 780 nm, and therefore, a role of the light absorbing layer may be performed in the whole visible region.

Even when having the same refractive index (n) value, a difference of $\Delta E^*ab=\sqrt{\{(\Delta L)^2+(\Delta a)^2+(\Delta b)^2\}}>1$ may be obtained when the extinction coefficient (k) value is 0 and when the extinction coefficient (k) value is 0.01 at 400 nm. For example, when simulating a case of irradiating D65 (solar spectrum) as a light source on a laminated structure of glass/indium (island-structured discontinuous film, thickness 30 nm)/aluminum oxynitride/air layer, E*ab values when the k values of the aluminum oxynitride are 0 and 0.01 are obtained as in the following Table 1. Herein, the thickness (h1) of the indium layer is 120 nm, and the thickness (h2) of the aluminum oxynitride layer is described in the following Table 1. The k values are arbitrarily set at 0 and 0.01 for the simulation, and as the n value, the value of indium is used.

TABLE 1

| h2 [nm] | k = 0 | | | k = 0.01 | | | ΔE*ab |
|---|---|---|---|---|---|---|---|
| | L | A | B | L | A | b | |
| 40 | 52.17 | 8.8 | −16.01 | 51.08 | 9.1 | −15.75 | 1.16 |
| 60 | 57.52 | 2.98 | −20.25 | 56.26 | 3.19 | −20.39 | 1.29 |
| 80 | 64.38 | −1.37 | −17.22 | 63.12 | −1.33 | −17.52 | 1.3 |

For example, using a method of absorbing light by adding a dye to a resin, and using a material having an extinction coefficient as described above leads to different light absorption spectra. When absorbing light by adding a dye to a resin, an absorption wavelength band is fixed, and only a phenomenon of varying an absorption amount depending on the changes in the coating thickness occurs. In addition, in order to obtain a target light absorption amount, changes in the thickness of at least a few micrometers or more are required to adjust the light absorption amount. On the other hand, in materials having an extinction coefficient, a wavelength band absorbing light changes even when the thickness changes by a several to tens of nanometer scale.

According to one embodiment, the light absorbing layer may be a single layer, or a multilayer of two or more layers.

The light absorbing layer may be formed with materials having an extinction coefficient (k) at 400 nm, preferably at 380 nm to 780 nm, that is, materials having an extinction coefficient of greater than 0 and less than or equal to 4. For example, the light absorbing layer may comprise one, two or more selected from the group consisting of metals, metalloids, and oxides, nitrides, oxynitrides and carbides of metals or metalloids. The oxides, nitrides, oxynitrides or carbides of metals or metalloids may be formed under a deposition condition and the like set by those skilled in the art. The light absorbing layer may also comprise the same metals, metalloids, alloys or oxynitrides of two or more types as the light reflective layer.

For example, the light absorbing layer may be a single layer or a multilayer comprising one, two or more types of materials selected from among indium (In), tin (Sn), silicon (Si), aluminum (Al), copper (Cu), nickel (Ni), vanadium (V), tungsten (W), tantalum (Ta), molybdenum (Mo), neodymium (Nd), titanium (Ti), iron (Fe), chromium (Cr), cobalt (Co), gold (Au) and silver (Ag), or oxides, nitrides or oxynitrides thereof. As specific examples, the light absorbing layer comprises one, two or more types selected from among copper oxides, copper nitrides, copper oxynitrides, aluminum oxides, aluminum nitrides, aluminum oxynitrides and molybdenum titanium oxynitrides.

According to one embodiment, the light absorbing layer comprises silicon (Si) or germanium (Ge).

The light absorbing layer formed with silicon (Si) or germanium (Ge) may have a refractive index (n) of 0 to 8, or 0 to 7 at 400 nm, and may have an extinction coefficient (k) of greater than 0 and less than or equal to 4, preferably 0.01 to 4, and the extinction coefficient (k) may be from 0.01 to 3 or from 0.01 to 1.

According to another embodiment, the light absorbing layer comprises one, two or more types selected from among copper oxides, copper nitrides, copper oxynitrides, aluminum oxides, aluminum nitrides, aluminum oxynitrides and molybdenum titanium oxynitrides. In this case, the light absorbing layer may have a refractive index (n) of 1 to 3, for example, 2 to 2.5 at 400 nm, and an extinction coefficient (k) of greater than 0 and less than or equal to 4, 0.01 to 2.5, preferably 0.2 to 2.5, and more preferably 0.2 to 0.6.

According to one embodiment, the light absorbing layer is AlOxNy (x>0, y>0).

According to another embodiment, the light absorbing layer may be AlOxNy (0≤x≤1.5, 0≤y≤1).

According to another embodiment, the light absorbing layer is AlOxNy (x>0, y>0), and with respect to the total number of atoms 100%, the number of each atom satisfies the following equation.

$$1 < \frac{(\text{Al})at \times 3}{(\text{O})at \times 2 + (\text{N})at \times 3} < 2$$

According to one embodiment, the light absorbing layer may be formed with materials having an extinction coefficient (k) at 400 nm, preferably at 380 nm to 780 nm.

According to one embodiment, the thickness of the light reflective layer may be determined depending on target color in a final structure, and for example, may be 1 nm or greater, preferably 25 nm or greater, and, for example, less than 50 nm.

According to one embodiment, the thickness of the light absorbing layer may be from 5 nm to 500 nm, for example, from 30 nm to 500 nm.

According to one embodiment, a difference in the thickness by the region of the light absorbing layer is from 2 nm to 200 nm, and may be determined depending on a target color difference.

According to another embodiment of the present application, a color film is further provided on a surface of the light reflective layer opposite to the surface facing the light absorbing layer; between the light reflective layer and the light absorbing layer; or on a surface of the light absorbing layer opposite to the surface facing the light reflective layer. When a transparent substrate is provided on the light reflective layer side, the color film may be provided between the light reflective layer and the transparent substrate; or on a surface of the transparent substrate opposite to the surface facing the light reflective layer. When a transparent substrate is provided on the light absorbing layer side, the color film may be provided between the light absorbing layer and the transparent substrate; or on a surface of the transparent substrate opposite to the surface facing the light absorbing layer.

When the color film is present compared to when the color film is not provided, the color film is not particularly limited as long as it has a color difference ΔE*ab, a distance in space of L*a*b* in a color coordinate CIE L*a*b* of the color developing layer, being greater than 1.

Colors may be expressed by CIE L*a*b*, and a color difference may be defined using a distance (ΔE*ab) in the L*a*b* space. Specifically, the color difference is ΔE*ab=√{(ΔL)²+(Δa)²+(Δb)²}, and within a range of 0<ΔE*ab<1, an observer may not recognize the color difference [reference document: Machine Graphics and Vision 20(4):383-411]. Accordingly, a color difference obtained by the color film addition may be defined by ΔE*ab>1 in the present specification.

FIG. 3(a) illustrates a structure in which a light reflective layer (201), a light absorbing layer (301) and a color film (401) are consecutively laminated, FIG. 3(b) illustrates a structure in which a light reflective layer (201), a color film (401) and a light absorbing layer (301) are consecutively laminated, and FIG. 3(c) illustrates a structure in which a color film (401), a light reflective layer (201) and a light absorbing layer (301) are consecutively laminated.

The color film may also perform the role of a substrate. For example, those materials that may be used as a substrate may be used as a color film by adding a pigment or a dye thereto.

The transparent substrate may be provided on a surface of the light reflective layer opposite to the surface facing the light absorbing layer; or on a surface of the light absorbing layer opposite to the surface facing the light reflective layer. FIG. 4(a) illustrates an example of the transparent substrate (101) being provided on a surface of the light reflective layer (201) opposite to the surface facing the light absorbing layer (301), and FIG. 4(b) illustrates an example of the transparent substrate (101) being provided on a surface of the light absorbing layer (301) opposite to the surface facing the light reflective layer (201).

For example, when the transparent substrate is provided on a surface of the light reflective layer opposite to the surface facing the light absorbing layer and the color film is located on a surface of the light reflective layer opposite to the surface facing the light absorbing layer, the color film may be provided between the transparent substrate and the light reflective layer; or on a surface of the transparent substrate opposite to the surface facing the light reflective layer. As another example, when the transparent substrate is provided on a surface of the light absorbing layer opposite to the surface facing the light reflective layer and the color film is located on a surface of the light absorbing layer opposite to the surface facing the light reflective layer, the color film may be provided between the transparent substrate and the light absorbing layer; or on a surface of the transparent substrate opposite to the surface facing the light absorbing layer.

According to another embodiment of the present application, the transparent substrate is provided on a surface of the light reflective layer opposite to the surface facing the light absorbing layer, and the color film is further provided. FIG. 5(a) illustrates a structure in which the color film (401) is provided on a surface of the light absorbing layer (301) opposite to the light reflective layer (201) side, FIG. 5(b) illustrates a structure in which the color film (401) is provided between the light absorbing layer (301) and the light reflective layer (201), FIG. 5(c) illustrates a structure in which the color film (401) is provided between the light reflective layer (201) and the transparent substrate (101), and FIG. 5(d) illustrates a structure in which the color film (401) is provided on a surface of the transparent substrate (101) opposite to the light reflective layer (201) side. FIG. 5(e) illustrates a structure in which color films (401a, 401b, 401c, 401d) are provided on a surface of the light absorbing layer (301) opposite to the light reflective layer (201) side, between the light absorbing layer (301) and the light reflective layer (201), between the light reflective layer (201) and the transparent substrate (101), and on a surface of the transparent substrate (101) opposite to the light reflective layer (201) side, respectively, however, the structure is not limited thereto, and 1 to 3 of the color films (401a, 401b, 401c, 401d) may not be included.

According to another embodiment of the present application, the transparent substrate is provided on a surface of the light absorbing layer opposite to the surface facing the light reflective layer, and the color film is further provided. FIG. 6(*a*) illustrates a structure in which the color film (401) is provided on a surface of the transparent substrate (101) opposite to the light absorbing layer (301) side, FIG. 6(*b*) illustrates a structure in which the color film (401) is provided between the transparent substrate (101) and the light absorbing layer (301), FIG. 6(*c*) illustrates a structure in which the color film (401) is provided between the light absorbing layer (301) and the light reflective layer (201), and FIG. 6(*d*) illustrates a structure in which the color film (401) is provided on a surface of the light reflective layer (201) opposite to the light absorbing layer (301) side. FIG. 6(*e*) illustrates a structure in which color films (401a, 401b, 401c, 401d) are provided on a surface of the transparent substrate (101) opposite to the light absorbing layer (201) side, between the transparent substrate (101) and the light absorbing layer (301), between the light absorbing layer (301) and the light reflective layer (201), and on a surface of the light reflective layer (201) opposite to the light absorbing layer (201) side, respectively. However, the structure is not limited thereto, and 1 to 3 of the color films (401a, 401b, 401c, 401d) may not be included.

In the structures such as FIG. 5(*b*) and FIG. 6(*c*), the light reflective layer may reflect light entering through the color film when the color film has visible light transmittance of greater than 0%, and therefore, colors may be obtained by laminating the light absorbing layer and the light reflective layer.

In the structures such as FIG. 5(*c*), FIG. 5(*d*) and FIG. 6(*d*), light transmittance of the colors developed from the color film of the light reflective layer (201) may be 1% or greater, preferably 3% or greater and more preferably 5% or greater so that changes in the color difference obtained by the color film addition may be recognized. This is due to the fact that light transmitted in such a light transmittance range may be mixed with colors obtained by the color film.

The color film may be provided as one sheet, or as a laminate of 2 sheets or more that are the same or different types.

As the color film, those materials capable of developing target colors by combining with colors developed from the laminated structure of the light reflective layer and the light absorbing layer described above may be used. For example, color films expressing colors by one, two or more types of pigments and dyes being dispersed into a matrix resin may be used. Such a color film may be formed by directly coating a composition for forming a color film on a color film-providable location, or a method of preparing a color film by coating a composition for forming a color film on a separate substrate, or using a known molding method such as casting or extrusion, and then disposing or attaching the color film on a color film-providable location, may be used.

The pigment and the dye capable of being included in the color film may be selected from among those capable of obtaining target colors from a final decoration member, and known in the art, and one, two or more types among pigments and dyes such as red-based, yellow-based, purple-based, blue-based or pink-based may be used. Specifically, dyes such as perinone-based red dyes, anthraquinone-based red dyes, methane-based yellow dyes, anthraquinone-based yellow dyes, anthraquinone-based purple dyes, phthalocyanine-based blue dyes, thioindigo-based pink dyes or isoxindigo-based pink dyes may be used either alone or as a combination. Pigments such as carbon black, copper phthalocyanine (C.I. Pigment Blue 15:3), C.I. Pigment Red 112, Pigment blue or isoindoline yellow may be used either alone or as a combination. As such dyes or pigments, those commercially available may be used, and for example, materials manufactured by Ciba ORACET or Chokwang Paint Ltd. may be used. Types of the dyes or pigments and colors thereof are for illustrative purposes only, and various known dyes or pigments may be used, and more diverse colors may be obtained therefrom.

As the matrix resin included in the color film, materials known as materials of transparent films, primer layers, adhesive layers or coating layers may be used, and the matrix resin is not particularly limited to these materials. For example, various materials such as acryl-based resins, polyethylene terephthalate-based resins, urethane-based resins, linear olefin-based resins, cycloolefin-based resins, epoxy-based resins or triacetylcellulose-based resins may be selected, and copolymers or mixtures of the materials illustrated above may also be used.

When the color film is disposed closer to the location of the observer of the decoration member than the light reflective layer or the light absorbing layer (as in, for example, the structures of FIGS. 5(*a*) and (*b*), and FIGS. 6(*a*), (*b*) and (*c*)), light transmittance of the colors developed by the color film from the light reflective layer, the light absorbing layer or the laminated structure of the light reflective layer and the light absorbing layer may be 1% or greater, preferably 3% or greater and more preferably 5% or greater. As a result, target colors may be obtained by combining colors developed from the color film and colors developed from the light reflective layer, the light absorbing layer or the laminated structure thereof.

The thickness of the color film is not particularly limited, and those skilled in the art may select and set the thickness as long as it is capable of obtaining target colors. For example, the color film may have a thickness of 500 nm to 1 mm.

According to another embodiment of the present application, when the light absorbing layer comprises a pattern, the pattern may have a symmetric structure, an asymmetric structure or a combination thereof.

According to one embodiment, the light absorbing layer may comprise a symmetric-structured pattern. As the symmetric structure, a prism structure, a lenticular lens structure and the like are included.

In the present specification, the asymmetric-structured pattern means having an asymmetric structure on at least one surface when observing from an upper surface, a side surface or a cross-section. The decoration member may develop dichroism when having such an asymmetric structure. Dichroism means different colors being observed depending on a viewing angle.

Dichroism may be expressed by $\Delta E^*ab = \sqrt{\{(\Delta L)^2 + (\Delta a)^2 + (\Delta b)^2\}}$ relating to the color difference described above, and a viewing angle-dependent color difference being $\Delta E^*ab > 1$ may be defined as having dichroism.

According to one embodiment, the light absorbing layer comprises a pattern in which an upper surface has a cone-shaped protrusion or groove. The cone shape comprises a shape of a circular cone, an oval cone or a polypyramid. Herein, the shape of the bottom surface of the polypyramid comprises a triangle, a square, a star shape having 5 or more protruding points, and the like. The cone shape may have a shape of a protrusion formed on an upper surface of the light absorbing layer, or a shape of a groove formed on an upper surface of the light absorbing layer. The protrusion has a triangular cross-section, and the groove has an inverted triangular cross-section. A lower surface of the light absorbing layer may also have the same shape as the upper surface of the light absorbing layer.

According to one embodiment, the cone-shaped pattern may have an asymmetric structure. For example, when rotating the cone-shaped pattern 360 degrees based on the vertex of the cone as observed from the upper surface, dichroism is difficult to be developed from the pattern when three or more of the same shapes are present. However, when rotating the cone-shaped pattern 360 degrees based on the vertex of the cone as observed from the upper surface, dichroism may be developed when two or less same shapes are present. FIG. 7 illustrates an upper surface of the cone shape, and (a) are illustrations of symmetric-structured cone shapes, and (b) are illustrations of asymmetric-structured cone shapes.

A symmetric-structured cone shape has a structure in which a cone-shaped bottom surface is a circle or a regular polygon having the same side lengths, and the vertex of the cone is present on a vertical line of the center of gravity of the bottom surface. However, an asymmetric-structured cone shape has a structure in which, when observing from the upper surface, the position of the vertex of the cone is present on a vertical line of a point that is not the center of gravity of the bottom surface, or has a structure in which the bottom surface is an asymmetric-structured polygon or oval. When the bottom surface is an asymmetric-structured polygon, at least one of the sides and the angles of the polygon may be designed to be different from the rest.

For example, as in FIG. 8, the position of the vertex of the cone may be changed. Specifically, when designing the vertex of the cone to be located on a vertical line of the center of gravity (O1) of the bottom surface when observing from the upper surface as in the first drawing of FIG. 8, 4 identical structures may be obtained when rotating 360 degrees based on the vertex of the cone (4-fold symmetry). However, the symmetric structure is broken by designing the vertex of the cone on a position (O2) that is not the center of gravity (O1) of the bottom surface. When employing a length of one side of the bottom surface as x, migration distances of the vertex of the cone as a and b, a height of the cone shape, a length of a line vertically connecting from the vertex of the cone (O1 or O2) to the bottom surface, as h, and an angle formed by the bottom surface and a side surface of the cone as θn, cosine values for Surface 1, Surface 2, Surface 3 and Surface 4 of FIG. 8 may be calculated as follows.

$$\cos(\theta 1) = \frac{\left(\frac{x}{2}\right)}{\mathrm{sqrt}\left(h^2 + \left(\frac{x}{2}\right)^2\right)} \quad \cos(\theta 3) = \frac{\left(\frac{x}{2} - a\right)}{\mathrm{sqrt}\left(h^2 + \left(\frac{x}{2} - a\right)^2\right)}$$

$$\cos(\theta 2) = \frac{\left(\frac{x}{2}\right)}{\mathrm{sqrt}\left(h^2 + \left(\frac{x}{2}\right)^2\right)} \quad \cos(\theta 4) = \frac{\left(\frac{x}{2} - b\right)}{\mathrm{sqrt}\left(h^2 + \left(\frac{x}{2} - b\right)^2\right)}$$

Herein, θ1 and θ2 are the same, and therefore, there is no dichroism. However, θ3 and θ4 are different, and |θ3−θ4| means a color difference between two colors (ΔE*ab), and therefore, dichroism may be obtained. Herein, |θ3−θ4|>0.

As above, how much the symmetric structure is broken, that is, a degree of asymmetry, may be represented quantitatively using an angle formed by the bottom surface and a side surface of the cone, and the value representing such a degree of asymmetry is proportional to a color difference of dichroism.

According to another embodiment, the light absorbing layer comprises a pattern having a protrusion in which the highest point has a line shape or a groove in which the lowest point has a line shape. The line shape may be a straight-line shape or a curved-line shape, and may comprise both a curved line and a straight line. When rotating the pattern having a line-shaped protrusion or groove 360 degrees based on the center of gravity of an upper surface as observed from the upper surface, dichroism is difficult to develop when two or more same shapes are present. However, when rotating the pattern having a line-shaped protrusion or groove 360 degrees based on the center of gravity of an upper surface as observed from the upper surface, dichroism may be developed when only one same shape is present. FIG. 9 illustrates an upper surface of a pattern having a line-shaped protrusion, and (a) illustrates a pattern having a line-shaped protrusion developing no dichroism and (b) illustrates a pattern having a line-shaped protrusion developing dichroism. An X-X' cross-section of FIG. 9(a) is an isosceles triangle or an equilateral triangle, and a Y-Y' cross-section of FIG. 9(b) is a triangle having different side lengths.

According to another embodiment, the light absorbing layer comprises a pattern in which an upper surface has a protrusion or groove with a structure in which the cone-shaped upper surface is cut. Such a cross-section of the pattern may have a trapezoidal or inverted trapezoidal shape. In this case, dichroism may also be developed by designing the upper surface, the side surface or the cross-section to have an asymmetric structure.

In addition to the structure illustrated above, various protrusion or groove patterns as in FIG. 10 may be obtained.

According to another embodiment of the present application, the light absorbing layer may comprise two or more regions with different thicknesses.

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

According to one embodiment, the light absorbing layer comprises a first region having a first inclined surface with an inclined angle in a range of 1 degrees to 90 degrees, and may further comprise a second region in which an upper surface has an inclined surface with a different slope direction or a different inclined angle from the first inclined surface, or an upper surface is horizontal. Herein, thicknesses in the first region and the second region may be different from each other in the light absorbing layer.

According to another embodiment, the light absorbing layer comprises a first region having a first inclined surface with an inclined angle in a range of 1 degrees to 90 degrees, and may further comprise two or more regions in which an upper surface has an inclined surface with a different slope direction or a different inclined angle from the first inclined surface, or an upper surface is horizontal. Herein, thicknesses in the first region and the two or more regions may all be different from each other in the light absorbing layer.

According to one embodiment, a substrate provided on a lower surface of the light reflective layer or an upper surface of the light absorbing layer may be further included. Surface properties such as an upper surface slope of the substrate may be the same as upper surfaces of the light reflective layer and the light absorbing layer. By forming the light reflective layer and the light absorbing layer using a deposition method, the substrate, the light reflective layer and the light absorbing layer may have an inclined surface with the same angle. For example, the structure as above may be obtained by forming an inclined surface or a three-dimensional structure on an upper surface of a substrate, and depositing a light reflective layer and a light absorbing layer thereon in this order, or depositing a light absorbing layer and a light reflective layer in this order.

According to one embodiment, the decoration element may be a deco film or a case of a mobile device. The decoration element may further comprise a gluing layer as necessary.

Materials of the substrate are not particularly limited, and ultraviolet curable resins known in the art may be used when forming an inclined surface or a three-dimensional structure using methods as above.

On the light absorbing layer, a protective layer may be further provided.

According to one embodiment, an adhesive layer may be further provided on an opposite surface of the substrate provided with the light absorbing layer or the light reflective layer. This adhesive layer may be an optically clear adhesive (OCA) layer. As necessary, a peel-off layer (release liner) may be further provided on the adhesive layer for protection.

Deposition such as a sputtering method has been described as an example of forming the light reflective layer and the light absorbing layer in the present specification, however, various methods of preparing a thin film may be used as long as constitutions and properties according to embodiments described in the present specification are obtained. For example, a vapor deposition method, a chemical vapor deposition (CVD) method, wet coating and the like may be used.

EXAMPLES

Hereinafter, the present disclosure will be described in more detail with reference to examples. However, the following examples are for illustrative purposes only, and are not to limit the scope of the present disclosure.

Comparative Examples 1 to 3

On a PET film, an aluminum (Al) layer was deposited to a thickness of 100 nm as a light reflective layer using a non-reactive deposition process (Ar 100%) under a vacuum condition of a process pressure of 3 mtorr. Subsequently, on the light reflective layer, an aluminum oxynitride light absorbing layer having a thickness of the following Table 2 was prepared using reactive sputtering deposition. The deposition process was performed under a vacuum condition of a base pressure of $3 \times 10^{-6}$ torr and a process pressure of 3 mtorr, Ar gas was adjusted to 100 sccm, and reactive gas $N_2$ was adjusted as set forth in Table 3 and Table 4. The reactive gas partial pressure section was 13.5% to 14%.

From the photograph of FIG. 11, it was seen that the aluminum layer was formed into a continuous film. Surface resistance of the prepared transparent substrate/aluminum layer/aluminum oxynitride layer is set forth in Table 2. A composition of the light absorbing layer and an $N_2$ gas flow rate when forming the light absorbing layer are shown in Table 3 and Table 4. Table 4 is a table listing n and k values of the aluminum oxynitride.

Examples 1 to 9

Preparation was carried out in the same manner as in Comparative Examples 1 to 3 except that the deposition was performed to a thickness as set forth in Table 2 using a non-reactive deposition process (Ar 100%) for forming an indium (In) layer or a tin (Sn) layer as the light reflective layer instead of the aluminum (Al) layer, and the light absorbing layer was formed to have a thickness as set forth in Table 2.

From the photographs of FIG. 12, it was seen that the indium layers of Examples 1 to 3 were formed as a discontinuous film. From the photographs of FIG. 13, it was seen that the indium layer of Example 4 was formed into a discontinuous film, and from the photographs of FIG. 14, it was seen that the tin layer of Example 7 was formed into a discontinuous film. According to FIG. 13 and FIG. 14, it was shown that the indium or the tin went through non-conductive deposition in an island growth form, and when depositing the light absorbing layer (AlON) thereon, it was shown to grow along the base shape. According to FIG. 14, it was shown that the island structure was formed using a tin (Sn) material in addition to indium (In).

Surface resistance of the prepared transparent substrate/light reflective layer/light absorbing layer is as in Table 2.

Surface resistance was measured in accordance with a 4-point probe method using a known surface resistor. Surface resistance was measured using a measuring device of Hiresta MCP-HT450, ASP PROBE.

TABLE 2

| | | Material | Thickness (nm) | Surface Resistance (Ω/square) |
|---|---|---|---|---|
| Comparative Example 1 | Light Reflective Layer | Al | 100 | 0.4 |
| | Light Absorbing Layer | AlON (13.5) | 40 | 6M |
| | Whole Laminate | Al/AlON | 140 | 0.4 |
| Comparative Example 2 | Light Reflective Layer | Al | 100 | 0.4 |
| | Light Absorbing Layer | AlON (13.8) | 40 | 70 M |
| | Whole Laminate | Al/AlON | 140 | 0.4 |
| Comparative Example 3 | Light Reflective Layer | Al | 100 | 0.4 |
| | Light Absorbing Layer | AlON (14) | 40 | OR |
| | Whole Laminate | Al/AlON | 140 | 0.4 |
| Example 1 | Light Reflective Layer | In | 30 | OR |
| | Light Absorbing Layer | AlON (13.5) | 40 | 6M |
| | Whole Laminate | In/AlON | 140 | 40M |
| Example 2 | Light Reflective Layer | In | 30 | OR |
| | Light Absorbing Layer | AlON (13.8) | 40 | 70M |
| | Whole Laminate | In/AlON | 140 | OR |
| Example 3 | Light Reflective Layer | In | 30 | OR |
| | Light Absorbing Layer | AlON (14) | 40 | OR |
| | Whole Laminate | In/AlON | 140 | OR |

TABLE 2-continued

| | | Material | Thickness (nm) | Surface Resistance (Ω/square) |
|---|---|---|---|---|
| Example 4 | Light Reflective Layer | In | 40 | OR |
| | Light Absorbing Layer | AlON (13.5) | 60 | 6M |
| | Whole Laminate | In/AlON | 140 | 40M |
| Example 5 | Light Reflective Layer | In | 40 | OR |
| | Light Absorbing Layer | AlON (13.8) | 60 | 70M |
| | Whole Laminate | In/AlON | 140 | OR |
| Example 6 | Light Reflective Layer | In | 40 | OR |
| | Light Absorbing Layer | AlON (14) | 60 | OR |
| | Whole Laminate | In/AlON | 140 | OR |
| Example 7 | Light Reflective Layer | Sn | 40 | OR |
| | Light Absorbing Layer | AlON (13.5) | 60 | 6M |
| | Whole Laminate | In/AlON | 140 | 40M |
| Example 8 | Light Reflective Layer | Sn | 40 | OR |
| | Light Absorbing Layer | AlON (13.8) | 60 | 70M |
| | Whole Laminate | In/AlON | 140 | OR |
| Example 9 | Light Reflective Layer | Sn | 40 | OR |
| | Light Absorbing Layer | AlON (14) | 60 | OR |
| | Whole Laminate | In/AlON | 140 | OR |

M: mega-ohm
OR: over range (greater than 1 giga-ohm/square at 5000 V, which was out of measurement range of the device)

Composition and surface resistance of the light absorbing layer are listed in the following Table 3, and an $N_2$ gas flow rate when forming the light absorbing layer, and a refractive index (n) and an extinction coefficient (k) of the light absorbing layer are listed in Table 4. FIG. 15 shows light reflectance of the indium layer.

TABLE 3

| | | $AlO_xN_y$ Layer | | |
|---|---|---|---|---|
| | $N_2$ Flow Rate (sccm) | Elemental Content (atomic %) | Relation Value | Surface Resistance (Ω/square) |
| Comparative Example 1, Example 1, Example 4, Example 7 | 13.5 | Al: 58.9 ± 0.2<br>O: 1.9 ± 0.3<br>N: 39.2 ± 0.5 | 1.5 | 6M |
| Comparative Example 2, Example 2, Example 5, Example 8 | 13.8 | Al: 59.0 ± 0.6<br>O: 1.7 ± 0.6<br>N: 39.3 ± 0.5 | 1.5 | 70M |
| Comparative Example 3, Example 3, Example 6, Example 9 | 14.0 | Al: 59.2 ± 0.1<br>O: 1.4 ± 0.7<br>N: 39.4 ± 0.7 | 1.5 | OR |

Relation: $1 < \dfrac{(Al)at \times 3}{(O)at \times 2 + (N)at \times 3} < 2$

TABLE 4

| | $N_2$ Flow Rate (sccm) | n at 400 nm | k at 400 nm |
|---|---|---|---|
| Comparative Example 1, Example 1, Example 4, Example 7 | 13.5 | 2.258 | 0.278 |
| Comparative Example 2, Example 2, Example 5, Example 8 | 13.8 | 2.217 | 0.198 |
| Comparative Example 3, Example 3, Example 6, Example 9 | 14 | 2.061 | 0.019 |

As shown in Table 3, it was seen that the laminates prepared in Examples 1 to 9 had higher surface resistance compared to the comparative examples, and as illustrated in FIG. 2, it was seen that the function of RF reception was enhanced by decreasing electro-magnetic wave shielding. Particularly, it was identified that the films of Examples 3, 6 and 9 comprising the indium layer and the aluminum oxynitride layer formed at a nitrogen partial pressure of 14% exhibited high resistance of 1 giga-ohm/square or greater when applying 5000 V.

The elemental content measurement in Table 3 is by an XPS analysis method, and specific conditions are as follows.

K-Alpha, Thermo Fisher Scientific Inc

X-ray source: monochromatic Al Kα (1486.6 eV),

X-ray spot size: 300 μm

Ar ion etching: monatomic (1000 eV, high, Raster width: 1.5 mm, sputter rate: 0.18 nm/s)

Operation mode: CAE (Constant Analyzer Energy) mode

Charge compensation: default FG03 mode (250 μA, 1 V)

| Element | Scan Range | Step Size | Per Point Dwell Time | Number of Scan | Pass Energy |
|---|---|---|---|---|---|
| Narrow (Snapshot) | 20.89 eV | 0.1 eV | 1 s | 10 | 150 eV |
| Survey | 10 eV to 1,350 eV | 1 eV | 10 ms | 10 | 200 eV |

*Peak background: use smart method

Results of simulating colors appearing when irradiating a light source D65 from a surface opposite to the surface adjoining the light reflective layer of the light absorbing layer through the air layer or the glass in the structures such as Comparative Example 1, Example 4 and Example 7 are shown in FIG. 16. These simulation results are simulation results for presenting colors obtained while changing the thickness of each of the aluminum layer in Comparative Example 1, the indium layer in Example 4 and the tin layer of Example 7 from 10 nm to 100 nm increasing by 10 nm when the layer adjoining the light reflective layer is the glass layer, and the layer adjoining the light absorbing layer is the air layer or the glass layer.

CIE L*ab color coordinate values of FIG. 16 are listed in the following Table 5. In each layer, the left-side value is a value when the thickness is 10 nm, and the right-side value is a value when the thickness is 100 nm.

TABLE 5

| | | 0 nm to 10 nm | ~20 nm | ~30 nm | ~40 nm | ~50 nm | ~60 nm | ~70 nm | ~80 nm | ~90 nm | 100 nm |
|---|---|---|---|---|---|---|---|---|---|---|---|
| In | Air | 60, 1, 15 | 47, 9, 22 | 38, 6, 7 | 38, 2, −7 | 43, −1, −9 | 49, −2, −8 | 53, −3, −4 | 55, −4, 0 | 55, −2, 4 | 55, 2, 6 |
| | Glass | 57, 4, 17 | 39, 10, 23 | 25, 12, 12 | 20, 5, −5 | 26, −1, −10 | 31, −3, −10 | 37, −3, −6 | 39, −3, −2 | 41, −3, 3 | 41, −2, 7 |
| Sn | Air | 59, 12, 22 | 46, 14, 6 | 46, 15, 2 | 41, 0, −12 | 46, −5, −9 | 50, −4, −6 | 54, −4, −2 | 55, −3, 3 | 56, −1, 7 | 55, 2, 6 |
| | Glass | 51, 9, 32 | 35, 14, 17 | 25, 12, −6 | 23, 2, −13 | 27, −1, −14 | 33, −5, −9 | 37, −5, −4 | 39, −6, 3 | 40, 0, 4 | 40, 2, 6 |
| Al | Air | 95, 0, 4 | 90, −1, 12 | 80, 0, 33 | 62, 15, 47 | 44, 22, 3 | 44, 6, −21 | 56, −5, −19 | 65, −8, −9 | 71, −6, −3 | 75, −7, 7 |
| | Glass | 93, 1, 2 | 89, −1, 10 | 79, 0, 4 | 69, 4, 32 | 57, 10, 21 | 52, 7, 4 | 54, 0, −4 | 58, −2, −6 | 62, −5, 1 | 65, −6, 7 |

The invention claimed is:

1. A decoration element comprising:
   a light reflective layer comprising indium (In), tin (Sn), or one or more alloys thereof, oxides thereof, nitrides thereof or oxynitrides thereof, wherein the light reflective layer has a structure comprising two or more islands, wherein each of the islands have a horizontal cross-sectional area of $10^{-14}$ m$^2$ or less, and wherein the light reflective layer has surface resistance of 20 ohm/square or greater; and
   a light absorbing layer provided on the light reflective layer comprising an aluminum oxynitride, wherein a thickness of the light absorbing layer is 5 nm-500 nm; wherein the light reflective layer is a discontinuous film.

2. The decoration element of claim 1, wherein the light reflective layer has surface resistance of 1 giga-ohm/square or greater.

3. The decoration element of claim 1, wherein the light absorbing layer is a continuous film or a discontinuous film.

4. The decoration element of claim 1, wherein the decoration element has surface resistance of 20 ohm/square or greater.

5. The decoration element of claim 1, wherein the decoration element has surface resistance of 1 giga-ohm/square or greater.

6. The decoration element of claim 1, wherein a color film is provided on a surface of the light reflective layer opposite to the surface facing the light absorbing layer; between the light reflective layer and the light absorbing layer; or on a surface of the light absorbing layer opposite to the surface facing the light reflective layer.

7. The decoration element of claim 6, wherein a transparent substrate is provided on a surface of the light reflective layer opposite to the surface facing the light absorbing layer, and the color film is provided between the transparent substrate and the light reflective layer; or on a surface of the transparent substrate opposite to the surface facing the light reflective layer, or a transparent substrate is provided on a surface of the light absorbing layer opposite to the surface facing the light reflective layer, and the color film is provided between the transparent substrate and the light absorbing layer; or on a surface of the transparent substrate opposite to the surface facing the light absorbing layer.

8. The decoration element of claim 1, wherein the light absorbing layer has a refractive index of 0 to 8 and an extinction coefficient of greater than 0 and less than or equal to 4 at 400 nm.

9. A deco film or a case of a mobile device comprising the decoration element of claim 1.

10. The decoration element of claim 1, wherein the light absorbing layer is a discontinuous film.

11. The decoration element of claim 1, wherein the light reflective layer is a single layer or a multilayer.

12. The decoration element of claim 1, wherein the thickness of the light absorbing layer is 30 nm-500 nm.

13. The decoration element of claim 1, wherein the light absorbing layer is AlO$_x$N$_y$, wherein 0<x≤1.5 and 0<y≤1.5.

14. The decoration element of claim 1, wherein the light absorbing layer is AlO$_x$N$_y$, wherein:

$$1 < \frac{(Al)\ at \times 3}{(O)\ at \times 2 + (N)\ at \times 3} < 2.$$

* * * * *